United States Patent
Ghods et al.

(10) Patent No.: US 10,892,905 B2
(45) Date of Patent: *Jan. 12, 2021

(54) REAL TIME NOTIFICATION OF ACTIVITIES THAT OCCUR IN A WEB-BASED COLLABORATION ENVIRONMENT

(71) Applicant: Box, Inc., Redwood City, CA (US)

(72) Inventors: Sam Ghods, San Francisco, CA (US); Arnold Goldberg, Los Altos, CA (US); Florian Jourda, Los Altos, CA (US); David T. Lee, Palo Alto, CA (US); Arshdeep Mand, Union City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,274

(22) Filed: Jan. 6, 2020

(65) Prior Publication Data

US 2020/0145239 A1 May 7, 2020

Related U.S. Application Data

(63) Continuation of application No. 13/152,982, filed on Jun. 3, 2011, now Pat. No. 10,554,426.

(60) Provisional application No. 61/445,490, filed on Feb. 22, 2011, provisional application No. 61/434,810, filed on Jan. 20, 2011.

(51) Int. Cl.
| | | |
|---|---|---|
| H04L 12/18 | (2006.01) | |
| H04L 29/08 | (2006.01) | |
| H04L 29/06 | (2006.01) | |
| G06Q 10/10 | (2012.01) | |

(52) U.S. Cl.
CPC ......... *H04L 12/1813* (2013.01); *G06Q 10/10* (2013.01); *H04L 12/1859* (2013.01); *H04L 67/22* (2013.01); *H04L 67/26* (2013.01); *H04L 63/02* (2013.01)

(58) Field of Classification Search
CPC ..... H04L 12/1859; H04L 67/22; H04L 67/26; G06Q 10/103
See application file for complete search history.

(56) References Cited

U.S. PATENT DOCUMENTS

| | | | | |
|---|---|---|---|---|
| 6,289,460 B1* | 9/2001 | Hajmiragha | .......... | H04L 9/3247 726/28 |
| 2002/0054117 A1* | 5/2002 | van Dantzich | ...... | G06Q 10/107 715/766 |
| 2004/0003352 A1* | 1/2004 | Bargeron | ............ | G06F 16/9535 715/230 |
| 2004/0068481 A1* | 4/2004 | Seshadri | ................ | G06Q 30/02 |

(Continued)

*Primary Examiner* — Chris Parry
*Assistant Examiner* — Adam A Cooney
(74) *Attorney, Agent, or Firm* — Sheridan Ross P.C.

(57) ABSTRACT

Systems and methods of real time notification of activities that occur in a web-based collaboration environment are disclosed. In one aspect, embodiments of the present disclosure include a method, which may be implemented on a system, for selecting a recipient of a notification an activity according to criteria determined based on a workspace in which the activity was performed in the online collaboration platform and/or sending the notification of the activity to the recipient such that the recipient is notified in real time or near real time to when the activity occurred.

20 Claims, 14 Drawing Sheets

(56) References Cited

U.S. PATENT DOCUMENTS

| | | | | |
|---|---|---|---|---|
| 2004/0128359 A1* | 7/2004 | Horvitz | H04L 67/26 | 709/207 |
| 2005/0033811 A1* | 2/2005 | Bhogal | G06F 40/166 | 709/206 |
| 2006/0164324 A1* | 7/2006 | Polivy | G06F 9/54 | 345/1.1 |
| 2007/0002736 A1* | 1/2007 | Gade | H04L 63/1408 | 370/230 |
| 2007/0150299 A1* | 6/2007 | Flory | H04L 63/20 | 705/51 |
| 2008/0222654 A1* | 9/2008 | Xu | G06Q 10/107 | 719/318 |
| 2008/0320025 A1* | 12/2008 | Ozzie | H04L 29/08675 | |
| 2009/0132651 A1* | 5/2009 | Roger | H04L 12/1822 | 709/204 |
| 2009/0171873 A1* | 7/2009 | Dolin | G06Q 40/02 | 706/20 |
| 2009/0210497 A1* | 8/2009 | Callanan | H04L 51/24 | 709/206 |
| 2009/0260060 A1* | 10/2009 | Smith | H04L 63/105 | 726/3 |
| 2009/0320035 A1* | 12/2009 | Ahlgren | G06F 9/468 | 718/104 |
| 2010/0036929 A1* | 2/2010 | Scherpa | H04L 51/04 | 709/207 |
| 2011/0004845 A1* | 1/2011 | Ciabarra | G06F 3/0481 | 715/808 |
| 2011/0258561 A1* | 10/2011 | Ladouceur | G06Q 10/103 | 715/753 |
| 2012/0149342 A1* | 6/2012 | Cohen | H04L 51/26 | 455/412.2 |
| 2012/0328259 A1* | 12/2012 | Seibert, Jr. | G06F 16/116 | 386/230 |

\* cited by examiner

FIG. 6

*FIG. 7* https://www.OurContent.net/files

Updates [23] | Files | Contacts | Apps | Philip Johnson | Upgrade

Files > marketing > ... > product >
Marketing active work

Files and folders | 5 discussions

Sort by: Date ▾ Prev 1 of 2 ▾ Next  | Upload | + New ... ▾

Start a new discussion *702*

How should our new powerpoint template look? ~ *705*
Created Sep 1, 2010 by You
▸ View all 5 Comments

- Jen Smith: I hate having the logo in the way of the title. Can we do a revision of this that is not so over-logo-ed? I think having the logo at the beginning of the presentation (the big blue main slide) and then small at the bottom of each slide would be better. *710*
  Dec 11, 2008 at 11:34 AM

- Aaron Frank: works for me.
  Dec 12, 2008 at 02:03 AM

- David Ark: If it's agreed, who can remove the logo? Right now the image is embedded into the blue bar on top.
  Dec 12, 2008 at 02:03 AM ➤ Enter your comment *715*

What kind of artwork do we need for new events — Tasks  Shared *725*
Created Sep 14, 2010 by You · 75.4KB
▸ View all 6 Comments

- Aaron Wall: It seems like it might be hard to read depending on how this looks in real life, just make lots of big (/Sharepoint) circles.
  Sep 14, 2010 at 11:35 AM
  Amy Chip: Good point -- I agree.
  Sep 14, 2010 at 12:55 PM  *730*

- Aaron Wall: yeah I think this one is good -- with our without the tagline -- as I think the symbol pretty much solves that (and you know my thoughts on rubbing in the NO HW/SW/etc for this crowd) -- I think this one is clean.
  Sep 14, 2010 at 01:17 PM

- Jen Smith: We need to connect the tagline with the circle -- so I'd like to include it.
  Sep 14, 2010 at 01:50 PM ➤ Enter your comment *735*

Folder options ▾ | 🔍 Search files

Get link to share this folder

15 Collaborators ▾
- David Ark (owner)
- You (Editor)
- Jen Smith
- Aaron Wall
- David Ark
- Jason
- Johnny
- Amy Chip

7 More Collaborators ▾

Enter email addresses here
✉ Invite Collaborators

Recently updated files
- Admin_folderpath-rollover
- admin_folderpath.png
- Admin_folderpath-icon.jpg

Resources
- 🗑 Trash: 212.6 KB
- ☑ Help articles
- ✉ Box user forum discussions
- ⊟ Report a problem

REAL TIME NOTIFICATION OF ACTIVITIES THAT OCCUR IN A WEB-BASED COLLABORATION ENVIRONMENT

CROSS REFERENCE TO RELATED APPLICATIONS

This application is a continuation of and claims priority to and the benefit of U.S. application Ser. No. 13/152,982 entitled "REAL TIME NOTIFICATION OF ACTIVITIES THAT OCCUR IN A WEB-BASED COLLABORATION ENVIRONMENT", which was filed on Jun. 3, 2011, which claims the priority of U.S. Provisional Patent Application No. 61/434,810 entitled "REAL TIME NOTIFICATIONS OF ACTIVITY AND REAL-TIME COLLABORATIONS IN A CLOUD-BASED ENVIRONMENT WITH APPLICATIONS IN ENTERPRISE SETTINGS", which was filed on Jan. 20, 2011, and U.S. Provisional Application No. 61/445,490 entitled "REAL TIME NOTIFICATIONS OF ACTIVITY AND REAL-TIME COLLABORATION IN A CLOUD-BASED ENVIRONMENT WITH APPLICATIONS IN ENTERPRISE SETTINGS, which was filed on Feb. 22, 2011, the contents of which are all incorporated by reference herein.

BACKGROUND

As electronic or digital content is used in enterprise settings or other organizations as the preferred mechanism for project, task, and work flow management, as has the need and use of streamlined collaboration and editing surrounding digital content and documents.

BRIEF DESCRIPTION OF THE DRAWINGS

FIG. 6 depicts a screenshot showing an example of a user interface for use in accessing and interacting with content or other work items a web-based collaboration environment.

FIG. 7 depicts a screenshot showing an example of a user interface for engaging in discussions surrounding work items with collaborators in real time in an online or web-based collaboration environment.

FIG. 8 depicts a screenshot showing an example of a user interface with a feed stream of real time or near real time notifications of activities that occur in a web-based collaboration environment.

DETAILED DESCRIPTION

Figure 1:
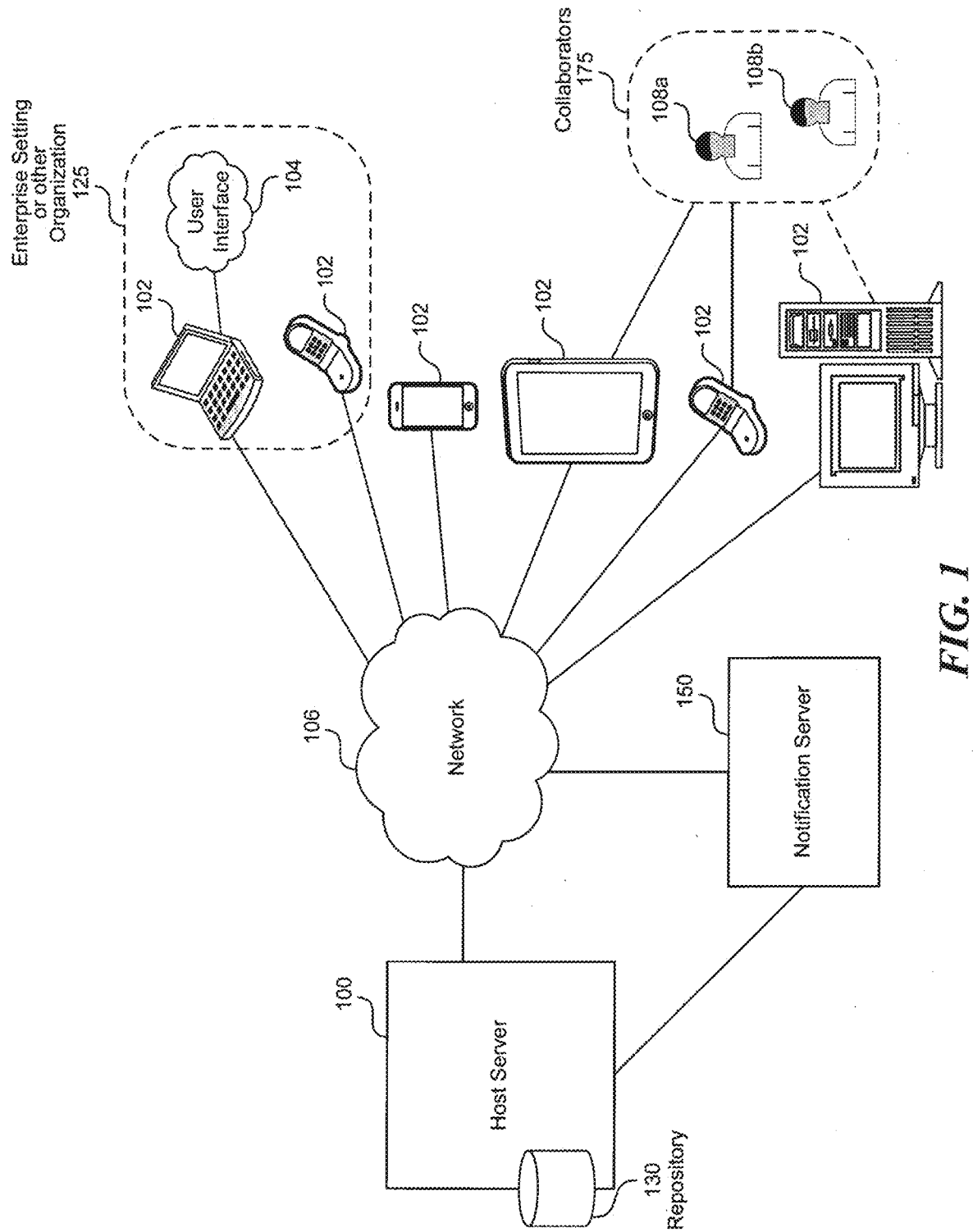
FIG. 1 illustrates an example diagram of a system where a host server and a notification server provide notifications of activities that occur in an online collaboration environment in real time or near real time to users.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods real time notification of activities that occur in a web-based collaboration environment.

FIG. 1 illustrates an example diagram of a system where a host server 100 and a notification server 150 provide notifications of activities that occur in an online collaboration environment in real time or near real time to users 108.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
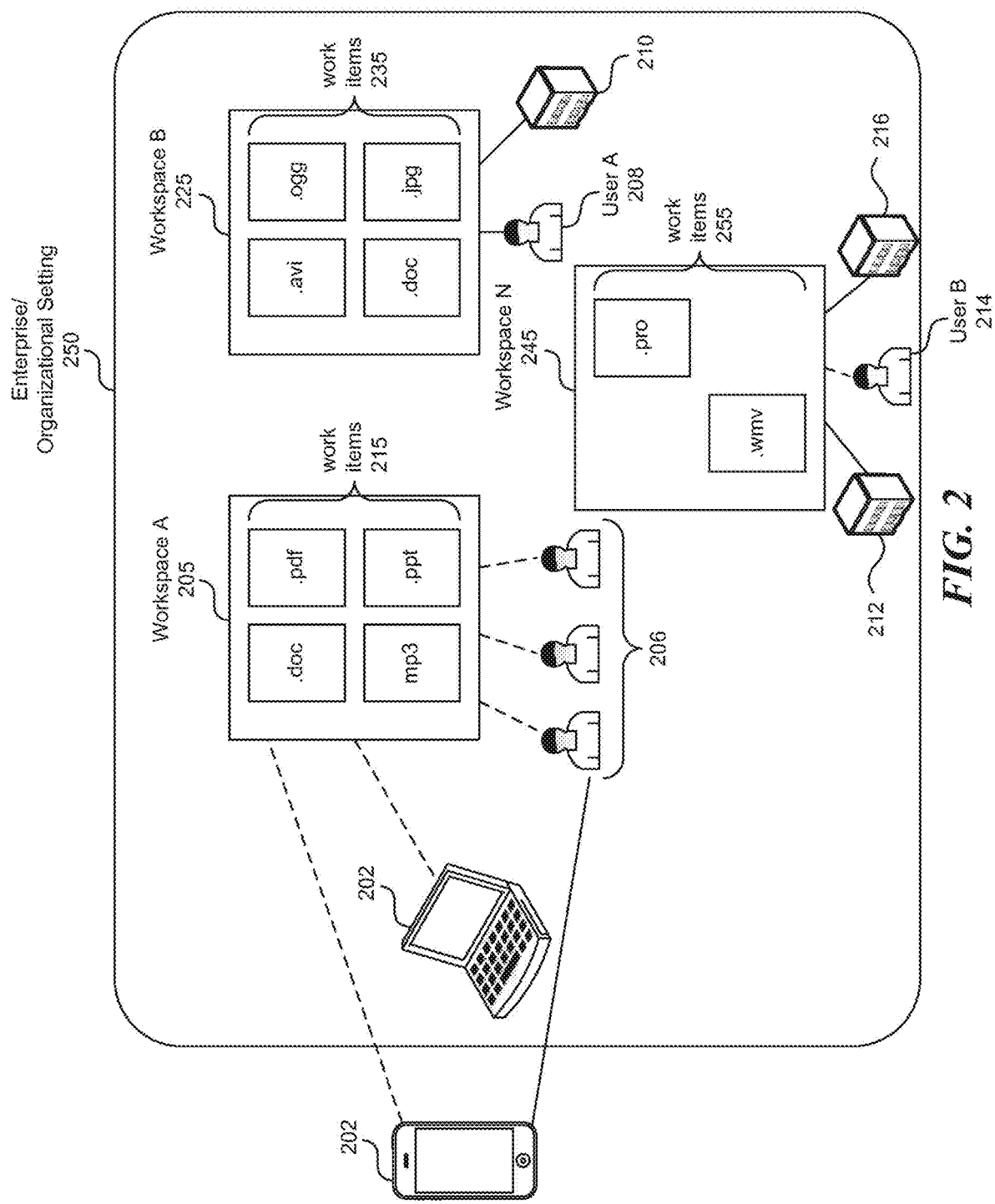
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, actions performed on work items or other activities that occur in a work space can be detected in real time or in near real time. In addition, users, collaborators, or select users can be notified in real time or near real-time of these actions or activities. Various mechanisms can be used to notify users or collaborators, including through the web interface to access the collaboration platform, via email, and/or SMS, for example.

Functions and techniques disclosed for real time or near real time notification of activities that occur in the online platform on a work item or in a work space can be performed by a push-enabled server (e.g., the notification server 150 coupled to the host server 100 of the collaboration platform. Functions and techniques performed by the host server 100, the notification server 150, and the related components therein are described, respectively, in detail with further reference to the examples of FIG. 4-5.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MIMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified in real time or in near real time. Activities which trigger real time notifications can include, by way of example but not limitation, adding, deleting, or modifying collaborators in the work space, adding, deleting a work item in the work space, creating a discussion topic in the work space.

The activity can be performed in relation to a discussion topic in the work space, for example, adding a response to a discussion topic, deleting a response, or editing a response in the work space. In addition, the activity is performed on a work item in the work space by the user, including, by way of example but not limitation, download or upload of a work item, deletion of editing of the work item, selecting, adding, deleting, and modifying a tag in the work item, preview of the work item or comment of the work item, setting or changing permissions of the work item, sharing a work item, emailing a link to the work item, and/or embedding a link to the work item on another website. Example user interfaces for accessing the collaborative environment or platform are illustrated with references to the example screenshots of FIG. 6-8.

Figure 3:
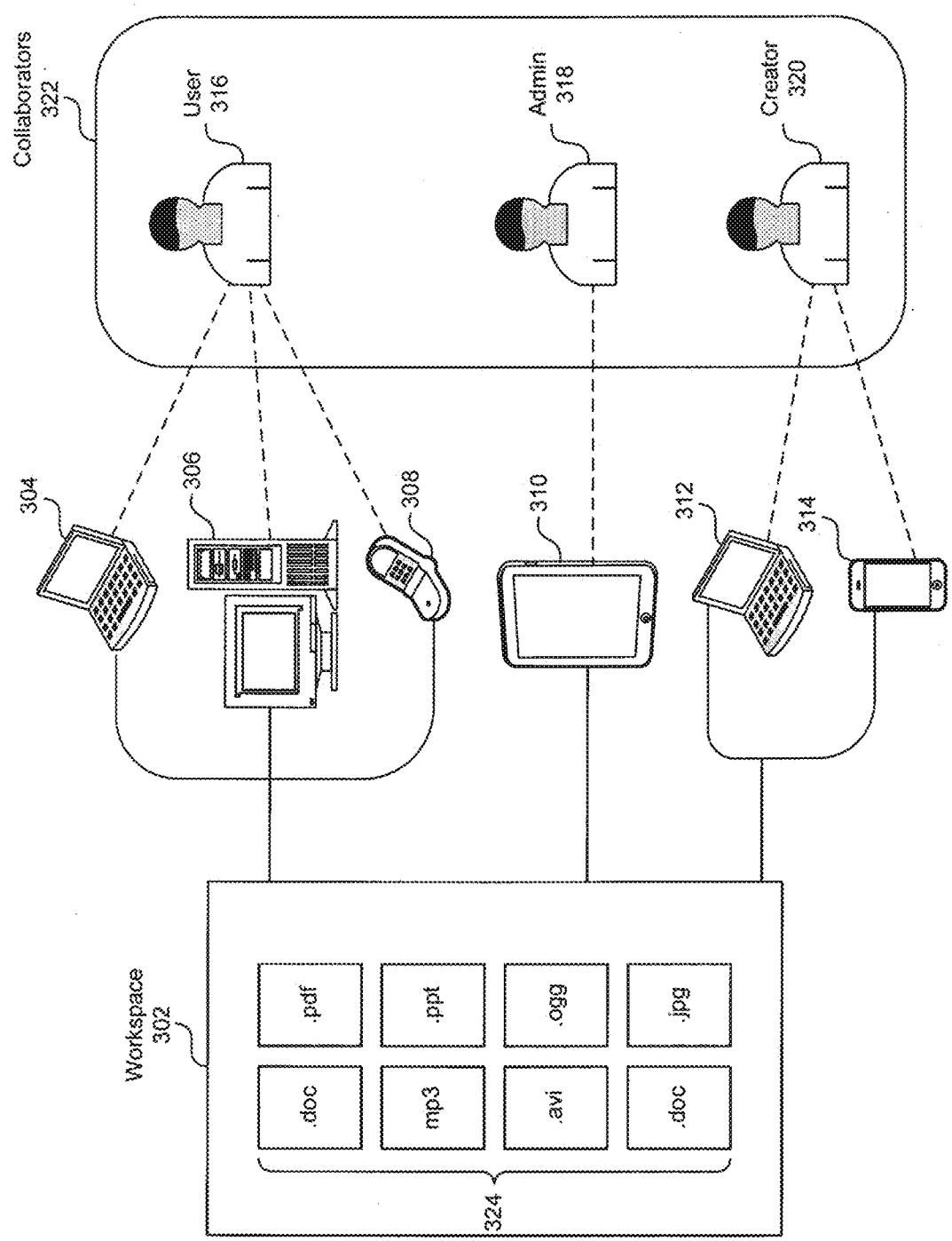
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Each user can be notified of actions performed on work items 324 by other users or any other types of activities detected in the work space 302. For example, if user 316 modifies a document, one or both of the other collaborators 318 and 320 can be notified of the modification in real time, or near real-time. The notifications can be sent through any of all of the devices associated with a given user, in various formats including, one or more of, email, SMS, or via a pop-up window in a user interface in which the user uses to access the collaboration platform (e.g., as shown in the example screenshot of FIG. 8). In the event of multiple notifications, each notification can be depicted preferentially (e.g., ordering in the user interface) based on user preferences and/or relevance to the user (e.g., implicit or explicit).

For example, a notification can be presented in a feed stream among other notifications through a user interface on the user device according to relevancy to the user determined based on current or recent activity of the user in the web-based collaboration environment. Preferential presentation of real time notifications is further described with references to the examples of FIG. 4 and the processes of FIG. 12-13.

Figure 4:
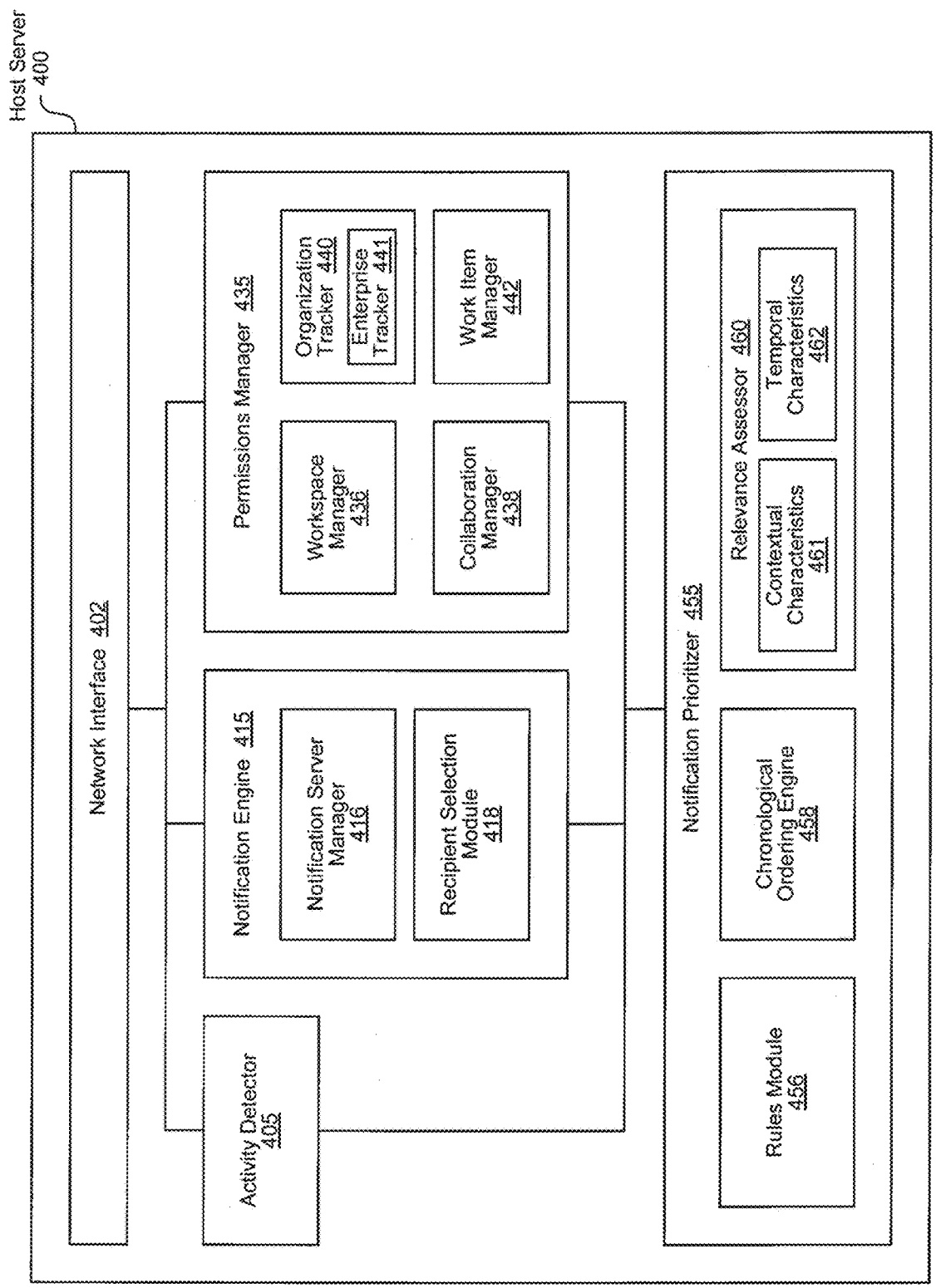
FIG. 4 depicts a block diagram illustrating an example of components in the host server of a web-based collaboration environment with real time activity notification capabilities.

FIG. 4 depicts a block diagram illustrating an example of components in the host server 400 of a web-based collaboration environment with real time activity notification capabilities.

The host server 400 of the web-based or online collaboration environment can generally be a cloud-based service. The host server 400 can include, for example, a network interface 402, an activity detector 405, a notification engine 415, a permissions manager 435 and/or a notification prioritizer 455. The notification engine 415 can include a notification server manager 416 and/or a recipient selection module, the permission manager 435 can include a workspace manager 426, a collaboration manager 438, an organization tracker 440 having an enterprise tracker 441, and/or a work item manager 442; the notification prioritizer 455 can further include a rules module 456, a chronological ordering engine 458, and/or a relevance assessor 460. Additional or less components/modules/engines can be included in the host server 400 and each illustrated component.

The network interface 402 can be a networking module that enables the host server 400 to mediate data in a network with an entity that is external to the host server 400, through any known and/or convenient communications protocol supported by the host and the external entity. The network interface 402 can include one or more of a network adaptor card, a wireless network interface card (e.g., SMS interface, WiFi interface, interfaces for various generations of mobile communication standards including but not limited to 1G, 2G, 3G, 3.50, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the activity detector 405 which can detect an activity in the web-based collaboration environment. The activity can be a triggering activity which causes select or relevant users to be notified of the occurrence, which in one embodiment, is in real time or near real-time.

The detected activity can be performed by a user or collaborator in a work space and can be performed on a work item or relating to a work item, for example, download or upload of the work item, previewing, commenting of a work item, deletion or editing of the work item, commenting on a work item, identifying, selecting, adding, deleting, saving, editing, and modifying a tag in the work item, setting or changing permissions of the work item, sharing the work item including, for example, emailing a link to the work item, embedding a link to the work item on another website.

The types of activities that can be detected can also relate to changes to a work space, such as adding, deleting, or modifying collaborators in the work space; changes to work items such as adding, deleting a work item in the work space; creating a discussion topic in the work space, adding a response to a discussion topic, deleting a response, or editing a response in the work space.

Detected activity in a work space that is performed by a user or otherwise occurring can trigger notifications to be sent out, for example, via the notification engine 415. The notification engine 415 can notify users, which can be collaborators of the user who performed the activity in the work space via one or more of many mechanisms, including but not limited to, email, SMS, voice-message, text-based message, RSS, feed, etc.

In one embodiment, the notification is depicted through a web-browser used by the other user to access the web-based collaboration environment, for access in real time or near real time to when the activity was performed by the user. When notifying a user in real time through a web-browser, the notification engine 415 can utilize a push-enabled service to ensure real time notification. In one embodiment, the notification is sent by a component or another server which implements push technology (e.g., the notification server 500 shown in the example of FIG. 5). The push-enabled service can be implemented via long poll or HTTP streaming, for example, by the notification sever 500 or another component, device which may be internal to or external to the host server 400. In addition, the host server 400 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

The host server 400 can send a notification server an identification of the recipient to be notified and indicator of the activity to notify the recipient of. Use of an external push server, such as the notification server 550 is described with further reference to the example of FIG. 5. The notification server 550 can be managed by the notification server manager 416 in the notification engine 415 which can communicate events to notify users in real-time via their browser interfaces. In one embodiment, the host server sends a notification server an identification of the recipient to be notified and indicator of the activity to notify the recipient of.

In general, recipients of an activity notification are selected based on criteria, for example, by the recipient selection module 418 of the notification engine 415. The criteria may be determined, for example, based on a work space in which the activity was performed in the online collaboration platform. Specifically, the criteria, is in one embodiment, determined based on permissions configured for the workspace, as managed, tracked, updated, implemented, revised, based by the permissions manager 435.

For example, the workspace can be associated with an enterprise and in such an instance, the criteria can specify that the recipient that is selected is an employee of the enterprise. Enterprise associations and affiliations can be managed by the organization tracker 440, for example; in some embodiments, enterprises and/or enterprise accounts can specifically be managed, tracked, monitored by the enterprise tracker 441. Permissions for the workspace can configured by a creator or administrative user of the workspace. The collaboration manager 438 can determine, track, and implement relationships, roles, and/or access levels of multiple users/collaborators. For example, users may be a general user, a creator of the work space, a creator of a work item, or an administrative user. The permissions for a work space can be configured by a user, creator, or the administrative user and is generally managed by the collaborations manager 438.

The criteria that are determined by work space permissions can be managed by the work space manager 436 in the permissions manager 435. The recipient selection module 418 can also determine the recipient selection criteria based on user affiliation with the workspace, including, one or more of, member, invited collaborator and collaborator in the workspace. Such user affiliation can be tracked and managed by, for example, the collaboration manger 438 of the permissions manager 435.

In one embodiment, the criteria are determined based on permissions associated with a work item on which the activity was performed in relation to in the workspace. Permissions associated with work items can be managed, tracked, updated, revised, or implemented, in one embodiment, by the work item manager 442. For example, the permissions associated with the work item can be set by, a creator of the work item or an administrative user of the work space. Each work space can include multiple work items where each of multiple work items has individually configurable permissions. The individually configured permissions can be determined by user roles and rights (e.g., as managed by the collaborations manager 438). The work item manager 442 can communicate with the collaboration manager 438 in setting, configuring, or re-configuring permissions associated with work items.

The notification of a triggering activity, can be presented to a selected user in the web-based or online collaboration environment such that the notification is accessible by the user in real time or near real time to when the triggering activity occurred. In one embodiment, the notification is presented via a user interface to the online collaboration platform, for example, when the recipient (e.g., selected recipient) is accessing the workspace (e.g., the same work space in which activity is detected) or when the recipient is accessing a different work space. Specifically, the real time or near real time notification can be presented to the user via the user interface if the user is online (e.g., online or otherwise logged into the web-based or online collaboration environment). Example screenshots of this online environment is illustrated with further references to the examples of FIG. 6-7 and examples of real time notifications are illustrated with further reference to the example of FIG. 8.

The notification engine 415 can determine the channel through which to notify selected users or recipients of activity. The channels that are used can include, indicators via a user interface to the online collaboration environment, SMS, audio message, text-based messages, email, desktop application, RSS, etc. The indicators presented via the user interface (e.g., the user interfaces shown in the example screenshots of FIG. 6-7) can include visual indicators (e.g., pop-up form including text and/or graphics), audio indicators, or any other types detectable by a user.

In one embodiment, the notification is presented in the user interface among other notifications in an order based a rule, which may be configurable by the recipient or another user. Such prioritization in presentation can be determined, managed, tracked, implemented, revised, or updated by the notification prioritizer 455, for example. The notification prioritizer 455 can present the notification in the user interface (e.g., as shown in the user interface of FIG. 8) among other notifications in an order based on a rule as determined by the rules module 456, for example.

The rule can indicate user preferences for notifications of activities based on one or more of, a type of activity that occurred and a user related to the activity. For example, a given user may explicitly or implicitly indicate preferences for activities or actions performed by specific other users or collaborators. A user may also indicate explicitly or implicitly preferences for types of activities that they wish to be notified of or not notified of. Users may also indicate that notifications for certain types of activities are to be prioritized other others. For example, a user may indicate that a notification for a 'comment on' activity is of a higher priority compared to a 'edit' activity.

In one embodiment, the notification is presented in the user interface among other notifications based on chronological order, for example as tracked or determined by the chronological ordering engine 458. For example, each notification can be depicted in the user interface based the time ordering when each associated triggering activity occurred. Notification of the most recently occurred activity can be depicted above or below other notifications, or in a location where most easily accessed by the recipient user.

In one embodiment, the notification is presented in the user interface among other notifications based on relevance to the recipient, for example, as determined, tracked, monitored, or implemented by the relevance assessor 460. The relevance to the recipient can be represented by, for example, contextual and temporal parameters. For example, contextual parameters provide metrics indicating the recipient's current activity in the online collaboration platform. Current activity can be any activity of the user that occurred within a certain time frame (e.g., within the last minute, within the last 5 minutes, within the last 10 minutes, for example). Activity of the user can include, a document that the user edited, viewed, downloaded, commented on, tagged, or otherwise accessed. Activity of the user can also include activities surrounding a workspace, including creation/modification of a workspace or attributes of a workspace, such as modification of collaborators, permissions, etc.

Temporal parameters can, for example, provide metrics indicating the recipient's activities in the online collaboration platform over a period of time, a frequency with which the recipient has accessed a work item with which the activity relates to, and/or a frequency with which the recipient has accessed the work space in which the activity was performed.

In one embodiment, notification messages can be assigned a priority rating on a scale (e.g., from 0, not important, to 100, very important) calculated depending on how much the recipient user is impacted by the notification. The impact on a user that a notification has can be indicated by, for example: 1) whether user needs to or has the option to respond to the notification? 2) whether the user (or owner)

of the content that has been updated? 3) is the user active on the content that has been updated?.

For notifications of user settings, assignment of priority can be based on, for example, any one or any combination of the following: 1) what are the type of events that the user wants to see more? 2) which collaborators that the user wants, likes, needs, or prefers to get the most notification from? Based on these priority ratings, notifications with a priority lower than a threshold (e.g., user-defined minimum threshold and/or system defined threshold) may not be not displayed, or displayed under select circumstances. In some instances, if too many notifications arrive at the same time, those with the highest priority are displayed. In one embodiment, similar notifications can be grouped together and assigned a priority as a group.

Figure 5:
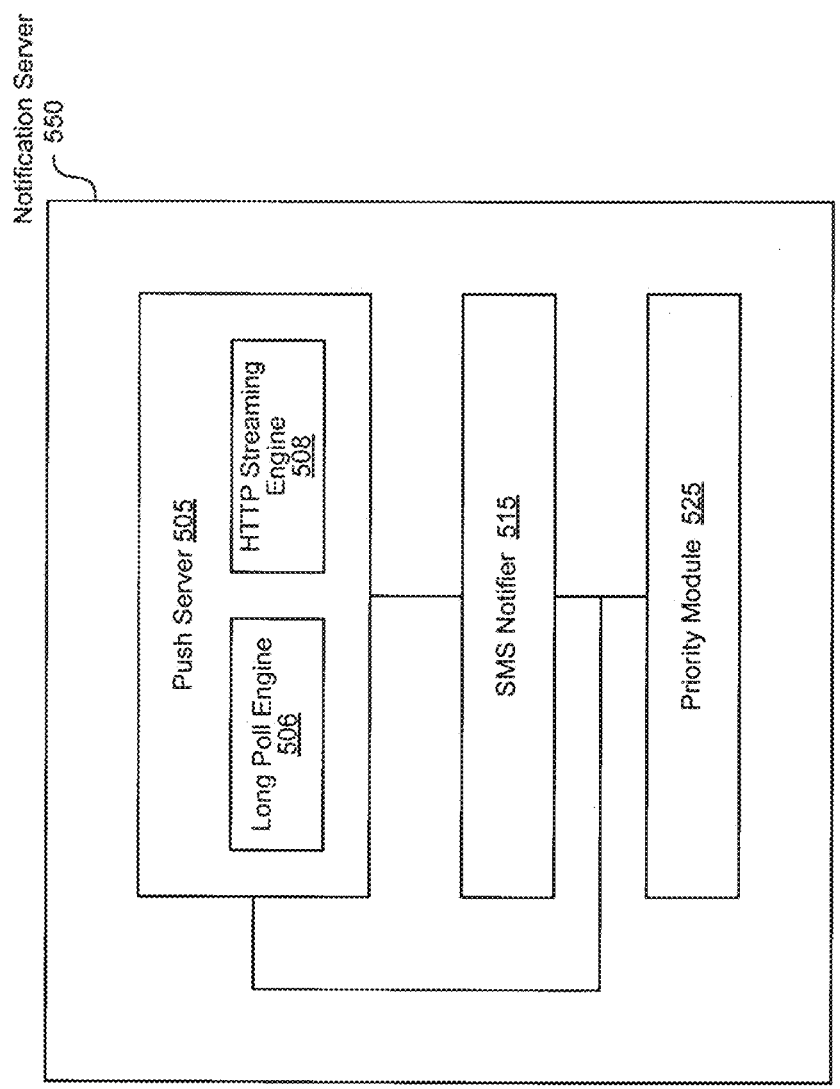
FIG. 5 depicts a block diagram illustrating an example of components in a notification server for providing real time or near real time notifications of activities that occur in a web-based or online collaboration environment.

FIG. 5 depicts a block diagram illustrating an example of components in a notification server 550 for providing real time or near real time notifications of activities that occur in a web-based or online collaboration environment.

The notification server 550 generally includes, for example, a push server 505, an SMS notifier 515, and/or a priority module 525. In one embodiment, the push server 505 includes a long poll engine 506 and/or an HTTP streaming engine 508. Additional or less components/modules/engines can be included in the notification server 550 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The notification server 550 can support the services of a collaboration platform or environment to provide real time or near real time notifications of activities. In one embodiment, the notification server 550 is integrated within a host server of a collaboration platform (e.g., the host server 100 shown in the example of FIG. 1 or the host server 400 shown in the example of FIG. 4, for example). The notification server 550 may also be externally coupled to the host server (e.g., the host server 100 or 400. In some instances, a portion of the functions implemented and performed by the notification server 550 can be implemented in part or in whole in the host server 100 or 400. For example, some of the components shown to be in the notification server 500 and associated functionalities can in part or in whole reside in the host server 100 or 400.

In one embodiment, the notification server 550 sends a notification of an activity that occurs within a collaboration platform to a recipient. The notification is sent by the server 550 such that the recipient is notified in real time or near real time to when the activity occurred or when the activity was performed. Real time notification can be performed via push technology, for example by the push server 505 through long polls (e.g., via the long poll engine 506) and/or through the HTTP streaming (e.g., via the HTTP streaming engine 506). The notification server 550 can communicate with the host server to determine a recipient to whom to notify. The notification server 550 can also determine the activity to notify the recipient of, for example through communication with the host server.

In one embodiment, the notification is presented in a feed stream among other notifications through a user interface on the user device according to relevancy to the user determined based on current or recent activity of the user in the web-based collaboration environment. The presentation priority in a user interface in a feed stream can be managed, in whole, or in part, for example, by the priority module 525 using information determined by the notification prioritizer (e.g., notification prioritizer 455 of host server 400 shown in the example of FIG. 4).

In one embodiment, the notification server 550 can send notifications to users via SMS (e.g., through the SMS notifier 515). In this instance, the notification server 500 can be coupled to an SMS center which forwards the SMS text message to a mobile device over a cellular network. The notification can be sent via SMS in real time or near real time, or with a delay.

Figure 6:
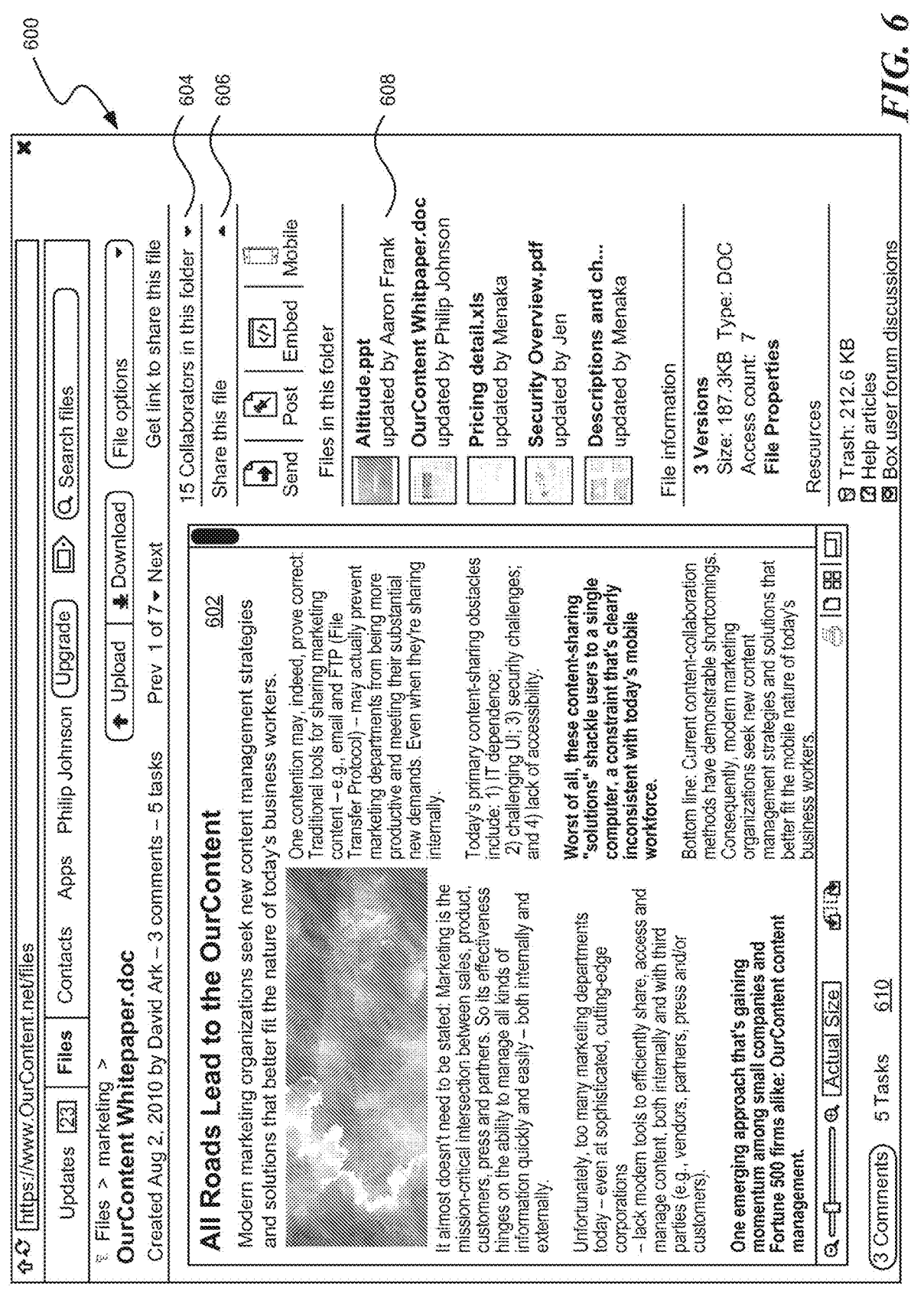

FIG. 6 depicts a screenshot showing an example of a user interface 600 for use in accessing and interacting with content or other work items a web-based collaboration environment.

In the example of FIG. 6, a work item 602 is depicted in the user interface to the collaboration environment. The user interface 600 also includes a portion 604 identifying collaborators of the work item 602, or collaborators of the folder (e.g., work space) which the work item 602 belongs to. The user interface 600 can include a portion 606 which includes various options for sharing the work item (e.g., file/document 602). In addition, the user interface 600 can include a portion 608 listing or otherwise identifying other work items (e.g., files) in the same folder (e.g., work space).

The collaboration platform/environment generally allows users or collaborators to define or assign tasks for the work item 602. Users or collaborators can comment on a given work item 602, as shown in this example in portion 610. In addition to commenting, users and collaborators can initiate, engage in, dialogues surrounding a work item or file 602, as further illustrated in the example screenshot of FIG. 7.

FIG. 7 depicts a screenshot showing an example of a user interface 700 for engaging in discussions surrounding work items with collaborators in real time in an online or web-based collaboration environment.

Discussion topics can be created by users (e.g., topics/questions 705 and 725) and users/collaborators in the work space. Once a discussion topic is created (e.g., via panel 702), the users/collaborators can provide comments or dialogue surrounding the topic (e.g., through "Enter your comment" field 715 or 735, for example). Commenting and/or dialogue features can also occur surrounding files (e.g., specific work items) or folders (e.g., specified work spaces).

Dialoging and/or commenting activities are some examples of actions or activities which can trigger notifications. For example, when a user comments (e.g., comment 710) on a discussion topic, other users (e.g., other collaborators) may be notified. The users that are notified can be others participating in the dialogue surrounding topic 705 or any or all other users in the work space. Users can be notified immediately (e.g., in real time or near real time) to when a comment or dialogue is sent. The notification can be sent via any mechanism, including but not limited to email, SMS, or through the user interface to the collaboration environment, as further illustrated in the example screenshot of FIG. 8.

Figure 8:
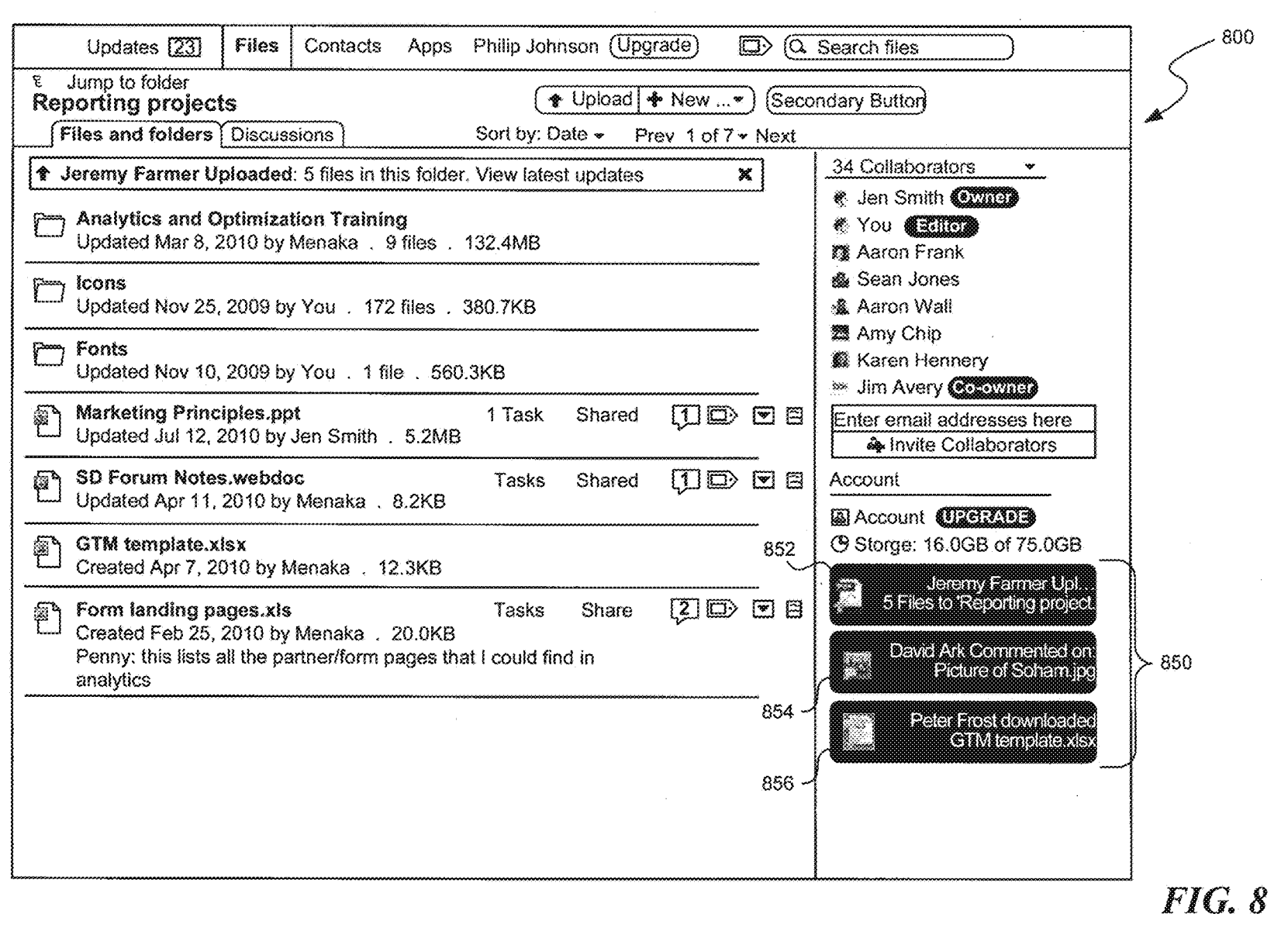

FIG. 8 depicts a screenshot showing an example of a user interface 800 with a feed stream 850 of real time or near real time notifications 850 of activities that occur in a web-based collaboration environment.

The example user interface 800 includes a feed stream 850 (e.g., real time or near real-time notifications) of activities or actions performed in the depicted work space (e.g., comprising of files, folders, discussions, etc.). Notifications for various types of activities can be presented; for example, notification 852 is sent in response to a user uploading files to the work space, notification 854 is triggered by a comment, notification 856 is triggered in response to the download of a file, for example. Notification triggering activities can include additional types of activities surrounding work items and/or work spaces and are not limited to those illustrated in the present example.

The example notifications shown in the example screenshot 800 includes an identification of the user who performed the activity or action, the type of activity, and the work item (e.g., file) on which the action was performed. Note that notifications can include additional or less information, for example, the time/date of the action can be included, the work space (e.g., a folder in which the acted on-file is stored) can be included, additional detail about the action can be included (e.g., an excerpt of an added comment). The amount of information and/or type of information included in a specific notification (e.g., notification 852, 854, or 856) can be configured or reconfigured, or specified by the user. The amount of information can be automatically adjusted by the collaboration platform, for example, based on device characteristics (e.g., screen size) or device/network resource availability.

In one embodiment, notifications are presented in a feed stream among other notifications through according to relevancy to the user, determined for example, based on current or recent activity of the user in the web-based collaboration environment.

Figure 9:
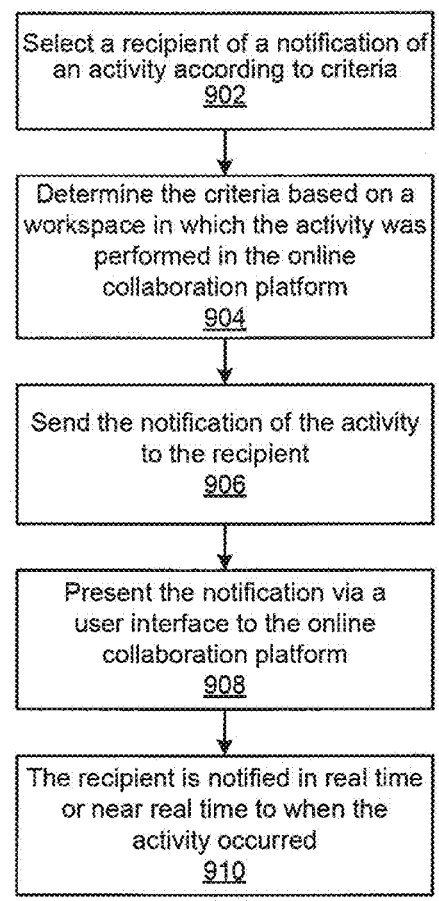
FIG. 9 depicts a flow chart illustrating an example process for selecting a recipient to notify of activities that occurred in an online collaboration environment.

FIG. 9 depicts a flow chart illustrating an example process for selecting a recipient to notify of activities that occurred in an online collaboration environment.

In process 902, a recipient of a notification of an activity is selected according to criteria. The recipient can be selected, for example, automatically by a web server which hosts the online collaboration environment/platform.

Figure 10:
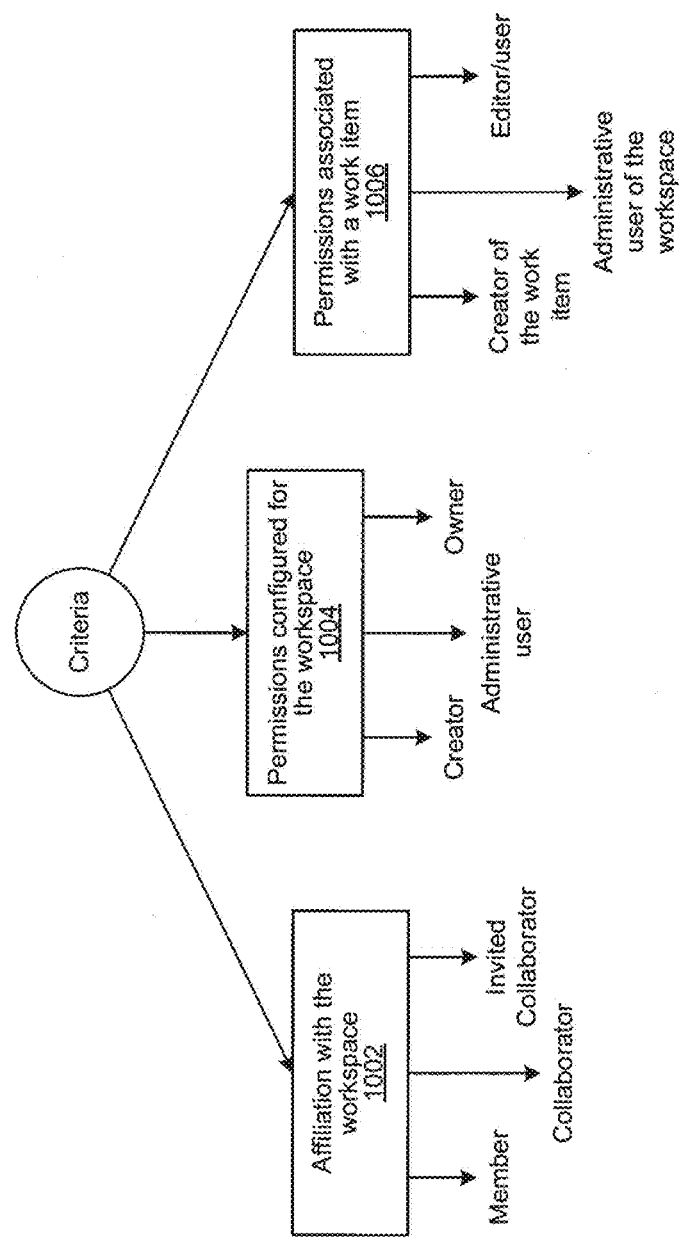
FIG. 10 depicts a diagram illustrating examples of criteria used to select notification recipients and the various pathways through which criteria are set.

In process 904, the criterion is determined based on a workspace in which the activity was performed in the online collaboration platform, some examples of criterion used to select recipients is illustrated with further reference to the example of FIG. 10.

In process 906, the notification of the activity is sent to the recipient. In one embodiment, the notification is sent by a server implementing push technology. The server may be a portion of the same web server or another server. The push technology can be implemented using, for example, long polls or HTTP streaming.

In process 908, the notification is presented via a user interface to the online collaboration platform. In process 910, the recipient is notified in real time or near real time to when the activity occurred. For example, the notification is presented in the user interface when the recipient is accessing the same workspace or a different workspace in which the triggering activity was performed.

FIG. 10 depicts a diagram illustrating examples of criteria used to select notification recipients and the various pathways through which criteria are set.

Criteria can be determined, for example, based on user affiliation with a work space 1002 (e.g., a work space in which a notification-triggering activity or action was performed or detected by the system). Types of user affiliations can include, for example, a member, a user, a collaborator, or an invited collaborator. Other types of affiliations can include, creator, administrator, manager, etc.

Criteria can also be determined based on permissions configured for the workspace, as shown in process 1004 and/or based on permissions associated with a work item 1006. Each criterion can be used alone or in combination with any number of others in the process of selecting recipients to notify. In some instances, a work space is associated with an organization such as an enterprise. In this instance the criteria used can include a requirement that the recipient that is selected is an employee of the enterprise, or other organization.

Figure 11:
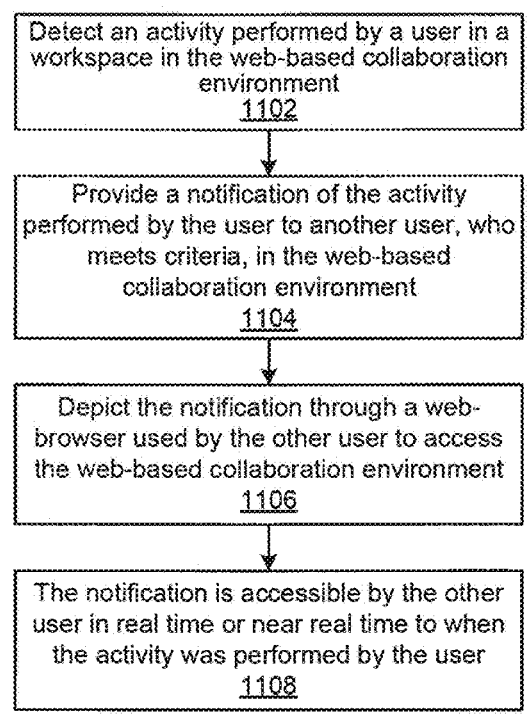
FIG. 11 depicts a flow chart illustrating another example process for notifying a user in a web-based collaboration environment of an activity performed by another user in a workspace.

FIG. 11 depicts a flow chart illustrating another example process for notifying a user in a web-based collaboration environment of an activity performed by another user in a workspace.

In process 1102, an activity performed by a user in a workspace is detected in the web-based collaboration environment. In process 1104, a notification of the activity performed by the user to another user, who meets criteria, in the web-based collaboration environment.

In process 1106, the notification is depicted through a web-browser used by the other user to access the web-based collaboration environment. The notification can also be sent to the user via email, SMS, or in an RSS feed, for example. In process 1108, the notification is accessible by the other user in real time or near real time to when the activity was performed by the user.

Figure 12:
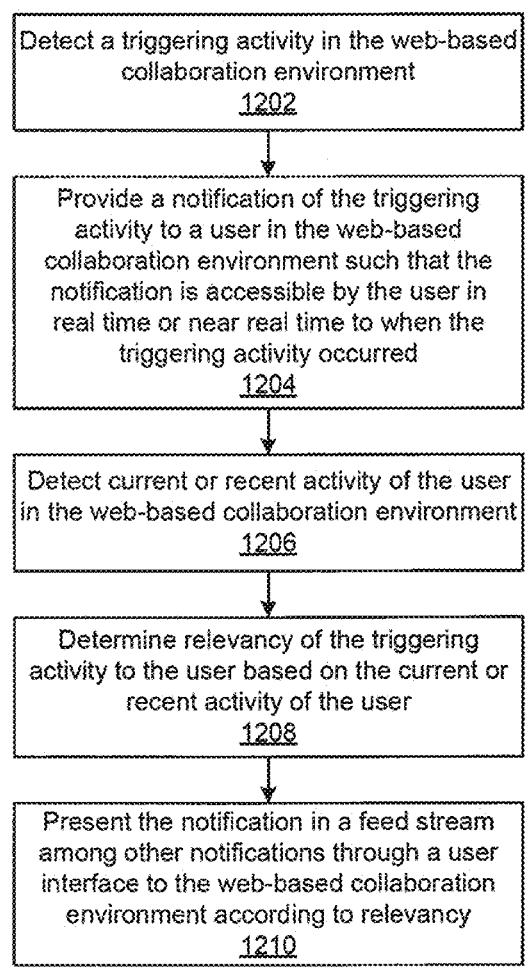
FIG. 12 depicts a flow chart illustrating an example process for presenting notifications in a feed stream among other notifications according to relevancy.

FIG. 12 depicts a flow chart illustrating an example process for presenting notifications in a feed stream among other notifications according to relevancy.

In process 1202, a triggering activity is detected in the web-based collaboration environment.

In process 1204, a notification of the triggering activity is provided to a user in the web-based collaboration environment such that the notification is accessible by the user in real time or near real time to when the triggering activity occurred. In one embodiment, the notification is presented in the user interface among other notifications in an order based on a rule. The rule can specify preferences for notifications of activities based on one or more of, a type of activity and a user related to the activity. In general, the rule is configurable by users, collaborators in a work space, (e.g., any selected recipient). In addition, the notification can be presented in the user interface among other notifications based on relevance to the recipient.

Figure 13:
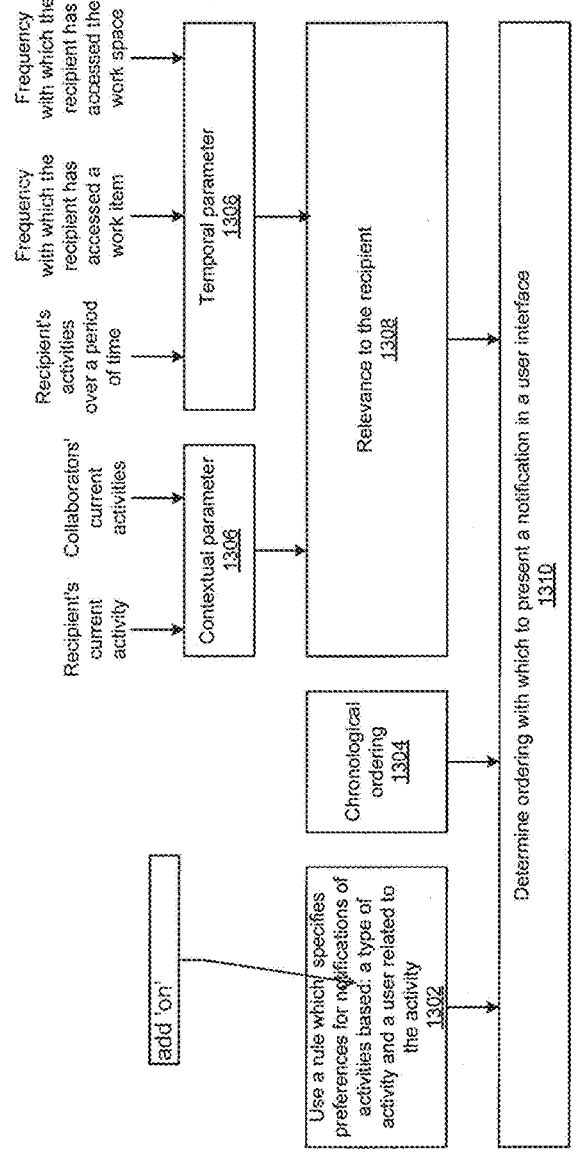
FIG. 13 depicts a diagram illustrating example processes for and parameters used in determining an ordering with which notifications of activity can be presented to a user.

In general relevance to the recipient can be characterized using one or more of, contextual and temporal parameters, examples of which are illustrated with further reference to the example of FIG. 13. In process 1206, current or recent activity of the user is detected in the web-based collaboration environment. In process 1208, relevancy of the triggering activity to the user is determined based on the current or recent activity of the user. In process 1210, the notification is presented in a feed stream among other notifications through a user interface to the web-based collaboration environment according to relevancy.

FIG. 13 depicts a diagram illustrating example processes for and parameters used in determining an ordering with which notifications of activity can be presented to a user.

In process 1302, a rule which specifies preferences for notifications of activities based on: a type of activity and/or a user related to the activity can be used to determine ordering with which to present a notification in a user interface. In process 1304, chronological ordering 1304 can be used to determine ordering with which to present a notification in a user interface.

In process 1306, contextual parameters can be used to characterize relevance to the recipient 1308 in determining the ordering. Contextual parameters can include, for example, the recipient's current activity and/or collaborator's current activities. Temporal parameters can include, for example, recipient's activities over a period of time, frequency with which the recipient has accessed a work item, and/or frequency with which the recipient has accessed the work space. Each process can be used alone or in conjunction with any number of other processes for determining the ordering of placement in the user interface of a notification in feeds.

Figure 14:
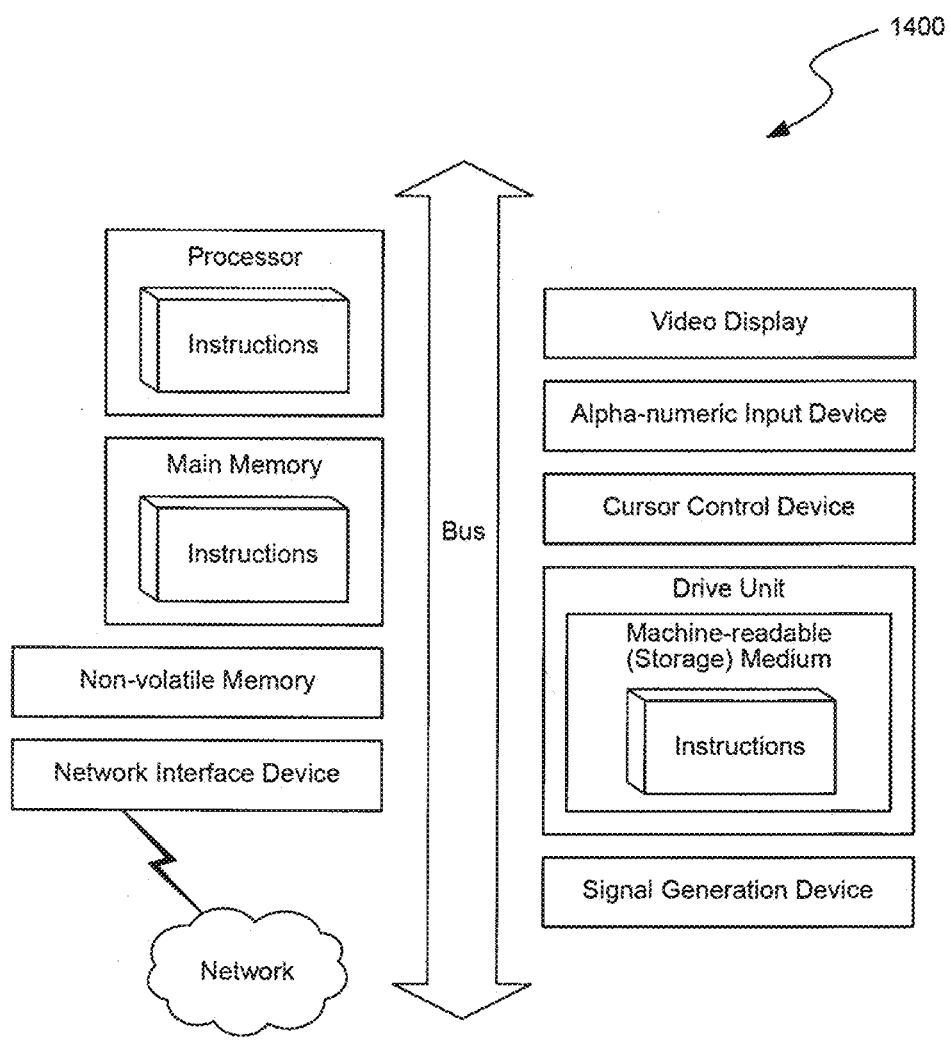
FIG. 14 shows a diagrammatic representation of a machine in the example form of a computer system within which a set of instructions, for causing the machine to perform any one or more of the methodologies discussed herein, may be executed.

FIG. 14 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method for notifying recipient collaborators of activities occurring in an online collaboration platform, the method comprising:
    selecting, by a server of the online collaboration platform, a recipient collaborator for notification of an activity occurring on an item in a workspace of the online collaboration platform, wherein the selection is made according to criteria determined based on the workspace in which the activity occurred in the online collaboration platform, and wherein the online collaboration platform is configured to include multiple workspaces, each workspace configured to have multiple items on which activities can be performed by a set of collaborators associated with the workspace;
    sending, by the server of the online collaboration platform, the notification of the activity to the recipient collaborator; and
    presenting, by the server of the online collaboration platform, the notification via a user interface of the online collaboration platform to the recipient collaborator, wherein the notification is presented via the user interface among multiple notifications in an order, wherein the presenting includes:
        computing a priority rating of each of the notifications based on a pre-defined priority rating explicitly assigned by the recipient collaborator to a type of activity associated with each of the notifications or a pre-defined priority rating explicitly assigned by the recipient collaborator to a user related to the activity,
        selecting the notifications whose priority rating exceeds a specified threshold to generate selected notifications,
        determining the order of the selected notifications based on the priority rating, and
        automatically adjusting, by the online collaboration platform, the amount of information to be displayed in the notification.

2. The computer-implemented method of claim 1, wherein the workspace is associated with an enterprise and the criteria specifies that the recipient collaborator that is selected is an employee of the enterprise.

3. The computer-implemented method of claim 1, wherein, the criteria is determined based on permissions or roles configured for the workspace and wherein the permissions or roles for the workspace are configured by a creator or administrative user of the workspace.

4. The computer-implemented method of claim 1, wherein the criteria is determined based on permissions or roles associated with the item on which the activity occurred, wherein the permissions or roles associated with the item are set by, a creator of the item or an administrative user of the workspace and wherein the workspace includes multiple items each having individually configurable permissions or roles.

5. The computer-implemented method of claim 1, wherein the notification is presented via the user interface to the recipient collaborator when the recipient collaborator accesses one or more of the workspace or a different workspace.

6. The computer-implemented method of claim 1, wherein the notification is presented via the user interface among other notifications in an order based on a rule that is configurable by the recipient collaborator.

7. The computer-implemented method of claim 1, wherein the notification is presented via the user interface among other notifications based on a chronological order.

8. A system comprising:
a processor; and
a memory coupled with and readable by the processor and storing therein a set of instructions which, when executed by the processor, causes the processor to notify recipient collaborators of activities occurring in an online collaboration platform by:
selecting a recipient collaborator for notification of an activity occurring on an item in a workspace of the online collaboration platform, wherein the selection is made according to criteria determined based on the workspace in which the activity occurred in the online collaboration platform, and wherein the online collaboration platform is configured to include multiple workspaces, each workspace configured to have multiple items on which activities can be performed by a set of collaborators associated with the workspace;
sending the notification of the activity to the recipient collaborator; and
presenting the notification via a user interface of the online collaboration platform to the recipient collaborator, wherein the notification is presented via the user interface among multiple notifications in an order, wherein the presenting includes:
computing a priority rating of each of the notifications based on a pre-defined priority rating explicitly assigned by the recipient collaborator to a type of activity associated with each of the notifications or a pre-defined priority rating explicitly assigned by the recipient collaborator to a user related to the activity,
selecting the notifications whose priority rating exceeds a specified threshold to generate selected notifications,
determining the order of the selected notifications based on the priority rating, and
automatically adjusting, by the online collaboration platform, the amount of information to be displayed in the notification.

9. The system of claim 8, wherein the workspace is associated with an enterprise and the criteria specifies that the recipient collaborator that is selected is an employee of the enterprise.

10. The system of claim 8, wherein, the criteria is determined based on permissions or roles configured for the workspace and wherein the permissions or roles for the workspace are configured by a creator or administrative user of the workspace.

11. The system of claim 8, wherein the criteria is determined based on permissions or roles associated with the item on which the activity occurred, wherein the permissions or roles associated with the item are set by, a creator of the item or an administrative user of the workspace and wherein the workspace includes multiple items each having individually configurable permissions or roles.

12. The system of claim 8, wherein the notification is presented via the user interface to the recipient collaborator when the recipient collaborator accesses one or more of the workspace or a different workspace.

13. The system of claim 8, wherein the notification is presented via the user interface among other notifications in an order based on a rule that is configurable by the recipient collaborator.

14. The system of claim 8, wherein the notification is presented via the user interface among other notifications based on a chronological order.

15. A non-transitory, computer-readable medium comprising a set of instructions stored therein which, when executed by a processor, causes the processor to notify recipient collaborators of activities occurring in an online collaboration platform by:
selecting a recipient collaborator for notification of an activity occurring on an item in a workspace of the online collaboration platform, wherein the selection is made according to criteria determined based on the workspace in which the activity occurred in the online collaboration platform, and wherein the online collaboration platform is configured to include multiple workspaces, each workspace configured to have multiple items on which activities can be performed by a set of collaborators associated with the workspace;
sending the notification of the activity to the recipient collaborator; and
presenting the notification via a user interface of the online collaboration platform to the recipient collaborator, wherein the notification is presented via the user interface among multiple notifications in an order, wherein the presenting includes:
computing a priority rating of each of the notifications based on a pre-defined priority rating explicitly assigned by the recipient collaborator to a type of activity associated with each of the notifications or a pre-defined priority rating explicitly assigned by the recipient collaborator to a user related to the activity,
selecting the notifications whose priority rating exceeds a specified threshold to generate selected notifications,
determining the order of the selected notifications based on the priority rating, and
automatically adjusting, by the online collaboration platform, the amount of information to be displayed in the notification.

16. The non-transitory, computer-readable medium of claim 15, wherein the workspace is associated with an enterprise and the criteria specifies that the recipient collaborator that is selected is an employee of the enterprise.

17. The non-transitory, computer-readable medium of claim 15, wherein, the criteria is determined based on permissions or roles configured for the workspace and wherein the permissions or roles for the workspace are configured by a creator or administrative user of the workspace.

18. The non-transitory, computer-readable medium of claim 15, wherein the criteria is determined based on permissions or roles associated with the item on which the activity occurred, wherein the permissions or roles associated with the item are set by, a creator of the item or an administrative user of the workspace and wherein the workspace includes multiple items each having individually configurable permissions or roles.

19. The non-transitory, computer-readable medium of claim 15, wherein the notification is presented via the user interface to the recipient collaborator when the recipient collaborator accesses one or more of the workspace or a different workspace.

20. The non-transitory, computer-readable medium of claim 15, wherein the notification is presented via the user interface among other notifications in an order based on a rule that is configurable by the recipient collaborator.

\* \* \* \* \*